(12) United States Patent
Golwalkar

(10) Patent No.: US 9,020,149 B1
(45) Date of Patent: Apr. 28, 2015

(54) PROTECTED STORAGE FOR CRYPTOGRAPHIC MATERIALS

(75) Inventor: Yogesh Vilas Golwalkar, Andhra Pradesh (IN)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 13/619,527

(22) Filed: Sep. 14, 2012

(51) Int. Cl.
*H04K 1/00* (2006.01)
*H04L 9/28* (2006.01)
*H04L 9/08* (2006.01)
*H04L 29/06* (2006.01)
*G06F 17/00* (2006.01)
*G06F 17/30* (2006.01)

(52) U.S. Cl.
CPC ........................................ *H04L 9/28* (2013.01)

(58) Field of Classification Search
USPC .......... 380/255; 713/168–174, 182–186, 202; 709/206, 225, 229, 249, 389; 726/2–8
See application file for complete search history.

(56) References Cited

U.S. PATENT DOCUMENTS

| | | | |
|---|---|---|---|
| 8,412,926 B1 * | 4/2013 | Gerraty .......................... | 713/150 |
| 2006/0117015 A1 * | 6/2006 | Bisbee et al. ...................... | 707/9 |
| 2006/0193470 A1 * | 8/2006 | Williams ........................ | 380/259 |
| 2006/0229992 A1 * | 10/2006 | Morten et al. ................... | 705/50 |
| 2009/0034733 A1 * | 2/2009 | Raman et al. ................... | 380/277 |
| 2009/0196417 A1 * | 8/2009 | Beaver et al. .................... | 380/45 |
| 2011/0069839 A1 * | 3/2011 | Tsuruoka et al. .............. | 380/279 |
| 2011/0173676 A1 * | 7/2011 | Peckover ........................... | 726/3 |
| 2012/0256732 A1 * | 10/2012 | McAllister .................... | 340/10.2 |

* cited by examiner

*Primary Examiner* — Evans Desrosiers
(74) *Attorney, Agent, or Firm* — Thomas | Horstemeyer, LLP

(57) ABSTRACT

Disclosed are various embodiments for obtaining a service request from a client, the service request including plaintext data to be encrypted and associated metadata. Ciphertext data is generated based upon the plaintext data. The ciphertext data is stored in a record in a data store of a cryptographic device. A service response is provided to the client, which includes a record identifier for the record in the data store.

20 Claims, 5 Drawing Sheets

PROTECTED STORAGE FOR CRYPTOGRAPHIC MATERIALS

BACKGROUND

Encryption is frequently used to ensure confidentiality of sensitive data. However, availability of the encrypted form of the sensitive data may offer an attack vector through which an attacker may be capable of determining the original, unencrypted form of the sensitive data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments of a cryptographic device, such as a hardware security module (HSM), for secure generation, storage, and management of cryptographic keys, ciphertext, and/or other cryptographic materials. The cryptographic device may offer services permitting clients to encrypt plaintext data, decrypt pre-existing ciphertext data stored in the cryptographic device, and validate that supplied plaintext data is identical to the plaintext form of pre-existing ciphertext data. In response to a client requesting the cryptographic device to encrypt supplied plaintext data, the cryptographic device may provide the client with an identifier with which the ciphertext stored in the cryptographic device may be referred. The identifier may be used by the client in place of the actual ciphertext data in order to later request decryption and/or validation services for the ciphertext. In the following discussion, a general description of the system and its components is provided, followed by a discussion of the operation of the same.

Figure 1:
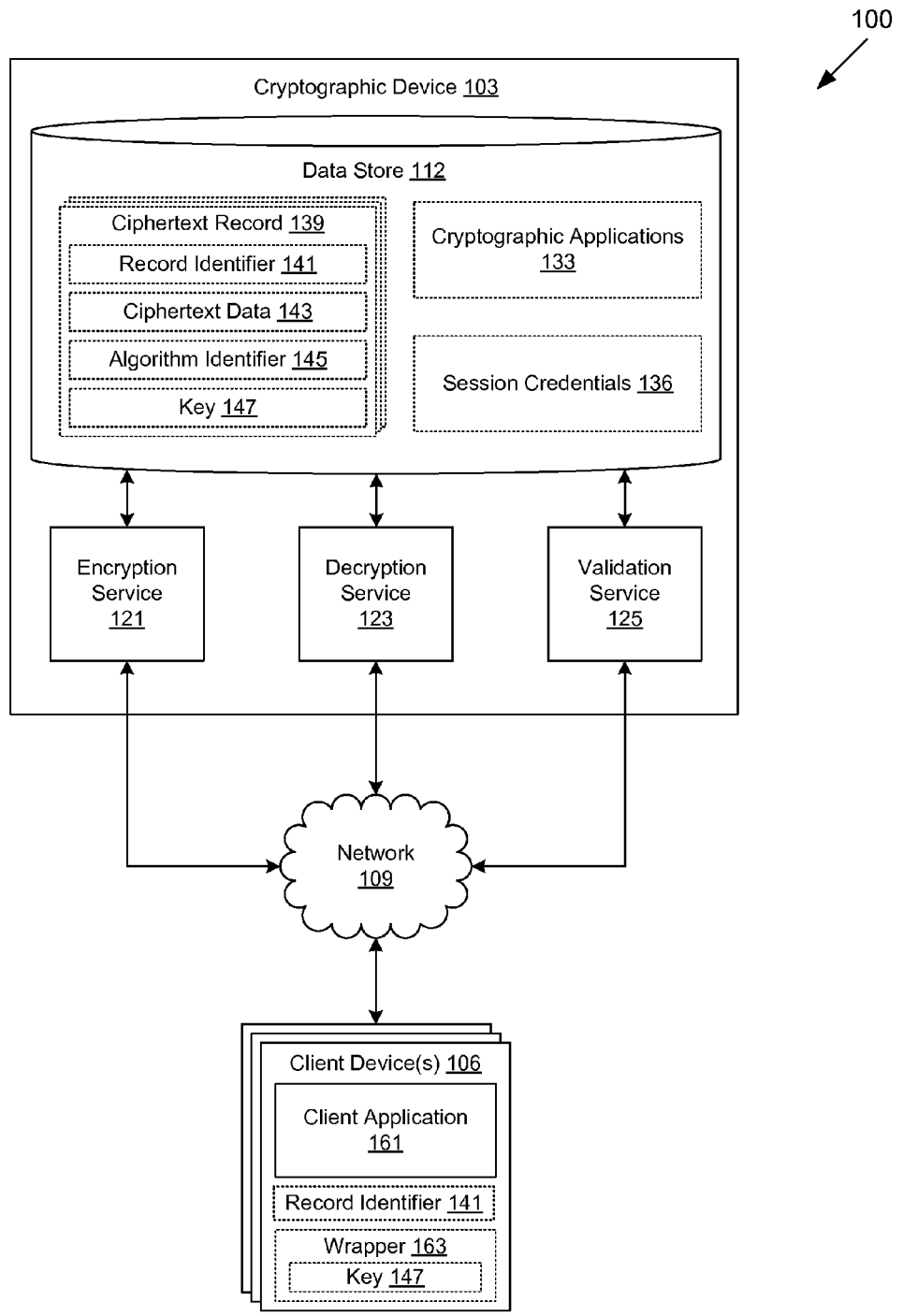
FIG. 1 is a drawing of a networked environment according to various embodiments of the present disclosure.

With reference to FIG. 1, shown is a networked environment 100 according to various embodiments. The networked environment 100 includes a cryptographic device 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. In alternate embodiments, the cryptographic device 103 may communicate with the client device 106 via a communication bus (e.g. universal serial bus (USB), peripheral component interconnect express (PCIe), etc.) instead of the network 109.

The cryptographic device 103 may comprise, for example, a computing device directed to performing cryptographic operations, as well as secure generation, storage, and management of cryptographic materials. Alternatively, the cryptographic device 103 may employ a plurality of computing devices that may be arranged, for example, in one or more computer banks or other arrangements. Such computing devices may be located in a single installation or may be distributed among many different geographical locations. For example, the cryptographic device 103 may include a plurality of computing devices that together may comprise a clustered computing arrangement. In some cases, the cryptographic device 103 may correspond to an elastic computing resource where the allotted capacity of processing, network, storage, or other computing-related resources may vary over time. In some embodiments, requests from client devices 106 may be dispatched to individual members of a cluster of cryptographic devices 103 by a proxy device.

The cryptographic device 103 may offer protection features such as, for example, logical and physical tamper protection. The tamper protection of the cryptographic device 103 may comprise tamper evidence, resistance, and response. As an example, the tamper response may include automated removal of cryptographic materials from a data store of the cryptographic device 103 upon detection of tampering.

Various applications and/or other functionality may be executed in the cryptographic device 103 according to various embodiments. Also, various data is stored in a data store 112 that is accessible to the cryptographic device 103. The data store 112 may be representative of a plurality of data stores 112 as can be appreciated. The data stored in the data store 112, for example, is associated with the operation of the various applications and/or functional entities described below.

The components executed on the cryptographic device 103, for example, include an encryption service 121, a decryption service 123, a validation service 125, and other applications, services, processes, systems, engines, or functionality not discussed in detail herein. The encryption service 121 is executed to encrypt input data, known as "plaintext" data in this context, using one or more cryptographic algorithms. The plaintext data may be supplied by a client device 106 seeking to transform the plaintext data into an obscured form, otherwise known as "ciphertext" data, which may not reveal the corresponding plaintext form except through use of the requisite credential(s).

The decryption service 123 is the complement to the encryption service 121 and is executed to provide the plaintext data corresponding to specified ciphertext data. To that end, the specified ciphertext data may be transformed through application of one or more cryptographic algorithms configured with the requisite credentials. The validation service 125 is executed to determine if a plaintext input supplied by the client device 106 is equivalent to the plaintext form of specified ciphertext data. The result of the validation service 125 may be a Boolean value indicating the truth associated with the equivalency. In some embodiments, the decryption service 123 or validation service 125 may be disabled based upon the nature of the data stored in the data store 112, the particular clients 106 requesting service, and/or other possible criteria. For example, if the cryptographic computing device 103 stores encrypted passwords, these may only need to validated rather than decrypted. Therefore, in this example, the decryption service 123 may be disabled.

The data stored in the data store 112 includes, for example, cryptographic applications 133, session credentials 136, ciphertext records 139, and potentially other data. The cryptographic applications 133 may include various applications facilitating the services of the encryption service 121, decryption service 123, and/or validation service 125. The cryptographic applications 133 may implement various cryptographic algorithms necessary for these aforementioned services such as, for example, advanced encryption standard (AES), RSA, Triple Data Encryption Algorithm (3-DES), Skipjack, and/or other cryptographic algorithms as can be appreciated. In some embodiments, all or a portion of the cryptographic applications 133 and/or other components of the cryptographic device 103 may comply with various standards specifying security requirements such as, for example, the Federal Information Processing Standards Publication (FIPS PUB) 140-2 issued May 25, 2001. The session credentials 136 include one or more credentials used to authenticate and/or secure communications between the cryptographic device 103 and the client devices 106. As a non-limiting example, the session credentials 136 may include shared keys, public/private key pairs, X.509 digital certificates, and/or other credentials as can be appreciated.

The ciphertext records 139 include various data associated with ciphertext data encrypted through the encryption service 121. The data included in each ciphertext record may include a record identifier 141, ciphertext data 143, algorithm identifier 145, key 147, and/or other data associated with the cryptographic transformation of plaintext data obtained through the encryption service 121. The record identifier 141 may be an identifier used by the cryptographic device 103 and/or client device 106 to reference a particular ciphertext record 139. For example, the record identifier 141 may be in the form of a universally unique identifier (UUID), globally unique identifier (GUID), or other type of identifier format as can be appreciated.

The ciphertext data 143 includes the ciphertext produced by the encryption service 121 embodying one or more cryptographic applications 133. The ciphertext data 143 may be produced by the encryption service 121 in response to obtaining a cryptographic request comprising plaintext data input from a client device 106. The algorithm identifier 145 may specify one or more cryptographic applications 133 used to convert plaintext data into the ciphertext data 143 associated with the given ciphertext record 139. The key 147 includes one or more keys used to configure the corresponding cryptographic applications 133 used to generate the ciphertext data 143 associated with the given ciphertext record 139.

The client 106 may comprise, for example, a server computer or any other system providing computing capability. Alternatively, the client 106 may employ a plurality of computing devices that may be employed that are arranged, for example, in one or more server banks or computer banks or other arrangements. Such computing devices may be located in a single installation or may be distributed among many different geographical locations. For example, the client 106 may include a plurality of computing devices that together may comprise a cloud computing resource, a grid computing resource, and/or any other distributed computing arrangement. In some cases, the client 106 may correspond to an elastic computing resource where the allotted capacity of processing, network, storage, or other computing-related resources may vary over time.

The client 106 may be configured to execute various applications such as a client application 161 and/or other applications, services, processes, systems, engines, or functionality not discussed in detail herein. The client application 161 may be executed in a client 106, for example, to access the cryptographic services offered by the cryptographic device 103 and/or other servers. The client application 161 may, for example, correspond to a stand-alone application, or the client application 161 may be implemented as a portion of the functionality of a larger application or suite of applications such as, for example, a data store management system. During the course of interactions with the cryptographic device 103, the client application 161 may store one or more record identifiers 141 and/or keys 147 associated with requested operations. In some embodiments, each of the keys 147 may be protected by a cryptographic wrapper 163. The wrapper 163 may be generated according to AES key wrap specification, TDKW, PSEC-KEM, public key cryptography standards (PKCS), and/or other symmetric or asymmetric key wrap specifications as can be appreciated.

Next, a general description of the operation of the various components of the networked environment 100 is provided. To begin, a client 106 may obtain data to be encrypted. To that end, the client 106 may establish a secure communication session with the cryptographic device 103. In some embodiments, the cryptographic device 103 may supply one or more session credentials 136 with which the client device 106 may authenticate the cryptographic device 103. The session credentials 136 supplied by the cryptographic device may include a digital certificate, a shared secret key, and/or other possible credentials as can be appreciated. In addition to authentication, the session credentials 136 may be used to facilitate encryption of the communication session, thereby ensuring confidentiality of the data as it is exchanged between the cryptographic device 103 and client 106.

As described previously, the cryptographic device may be accessible to the client 106 via the network 109 and/or via a local communication bus of the client 106. For cryptographic devices 103 accessible over the network 109, establishing a secure communication session may occur as part of a secure socket layer/transport layer security (SSL/TLS) negotiation. Furthermore, in some embodiments, the client 106 may also provide one or more session credentials with which the cryptographic device 103 may authenticate the client device 106, therein providing mutual authentication. For cryptographic devices 103 present on a local communication bus of the client 106, a secure communication session may be established using similar techniques as applied in the context of the network 109. Alternatively, the secure communication session may be based on the inherent authentication and confidentiality provided by the presence of the cryptographic device 103 present on a local communications bus of the client 106.

Upon establishing a communication session with the cryptographic device 103, the client 106 may provide the encryption service 121 with a session request that includes the data to be encrypted. The data to be encrypted may be referred to as "plaintext" data throughout the present disclosure. However, as one skilled in the art may appreciate, use of the term "plaintext" does not require the data to be in a text format (e.g. American standard code for information interchange (ASCII), Unicode, etc.), nor does it suggest the data has no other encryption presently applied. A unit of data may simply be referred to as plaintext if it is in a non-encrypted state relative to a pending cryptographic operation.

In some embodiments, the client 106 may also provide the cryptographic device 103 with various metadata associated with the plaintext data. The metadata may include a particular cryptographic application 133 or class of cryptographic application 133 to be applied, a particular key 147 to be used, a use restriction for the plaintext data (e.g. it may be verified, but not decrypted), a request to return the key 147 used to perform the encryption, and/or other possible metadata as can be appreciated. In some embodiments, portions of the metadata may be stored in the ciphertext record 139 and/or other locations of the data store 112.

For example, a session request from the client 106 to the encryption service 121 may include a user-supplied password to be encrypted. The metadata associated with the session request for the password may specify that the password should be encrypted using 256-bit AES; the encrypted text should be available only for validation, not decryption; and the key 147 used to encrypt the password should be returned once the encryption operation is complete.

Once the encryption service 121 obtains the plaintext data and any needed metadata, the encryption service 121 may verify the local resources of the data store 112 are sufficient to create another ciphertext record 139 in which to store the ciphertext data 143 to be produced as a result of the encryption. In some embodiments, if the resources of the data store 112 are not sufficient, the ciphertext data 143 produced by the operation may be stored in a remote data store accessible to the cryptographic device 103 via the network 109. If the available resources are sufficient, the requested encryption operation may be carried out by one or more of the cryptographic applications 133 configured according to any metadata associated with the request and a default configuration of the cryptographic device 103.

Returning to the prior example of encrypting a user password, the metadata specified using 256-bit AES to perform the encryption, but no encryption key 147 was specified. In this example, the default configuration of the cryptographic device 103 may be to generate a key 147 if no key is provided in the metadata associated with a session request. Furthermore, the default configuration may specify a default encryption algorithm and/or other possible options to be used in the absence of corresponding metadata associated with the session request.

Throughout this disclosure, the default configuration may be used as a metadata "gap filler," where possible, in the absence of metadata that may be specified by the client 106 during use of the various services offered by the cryptographic device 103. In this example, a cryptographic application 133 may be used to generate a key 147 sufficient for use by another cryptographic application 133 implementing a 256-bit AES encryption algorithm. Thereafter, the password supplied in the example session request may be encrypted by a cryptographic application 133 implementing a 256-bit AES encryption algorithm which is configured using the key 147.

The output of a cryptographic application 133 performing the encryption may be stored as ciphertext data 143. Additionally, an algorithm identifier 145 for the particular encryption algorithm used, the key 147 used to configure the cryptographic application 133 implementing the encryption algorithm, and/or other possible metadata may also be stored in the ciphertext record 139. Upon successful completion of the encryption operation, a record identifier 141 may be provided to the client device 106 corresponding to unique identifier for the ciphertext record 139. Furthermore, if requested by the client device 106, the key 147 may be provided to the client device upon completion of the encryption operation. The key 147 returned may be protected by an encrypted wrapper 163 that permits confidential storage of the key 147 in a reduced-security environment such as the client device 106.

Once the ciphertext data 143 has been created and stored by the cryptographic device 103, the client device 106 may later refer to the ciphertext data 143 using the record identifier 141 for the associated ciphertext record 139. The client 106 may later refer to the ciphertext data 143 in the context of the services offered by the cryptographic device 103 including the decryption service 123, the validation service 125, and/or other possible services as can be appreciated. As previously described in association with the encryption service 121, the client 106 may establish a secure communication session with the cryptographic device 103 prior to making cryptographic service requests of the decryption service 123, the validation service 125, and/or other possible services.

The client 106 may make a service request to the decryption service 123 in order to transform a particular ciphertext data 143 back into the plaintext form in which it was originally submitted to the encryption service 121. The service request made to the decryption service 123 may comprise the record identifier 141 identifying the particular ciphertext record 139 associated with the ciphertext data 143. In some embodiments, the service request may further comprise one or more authentication credentials associated with the ciphertext record 139.

As an example, the key 147 may serve as an authentication credential that may be supplied by the client 106 and compared to the key 147 associated with the sought ciphertext record 139. The key 147 held by the client 106 may be extracted from the wrapper 163 prior to providing it to the decryption service 123, or the wrapper 163, including the key 147, may be provided to the decryption service 123. In the event the wrapper 163 is provide to the decryption service 123, the key 147 may be extracted from the wrapper 163 by the cryptographic device 103 through use of one of the cryptographic applications 133 directed toward decryption. During such an operation, the wrapper key to be used for extracting the key 147 from the wrapper 163 may be found in the session credentials 136, in the ciphertext record 139, in credentials supplied by the client 106, and/or other possible sources.

Once the record identifier 141 is obtained from the client 106 and any necessary authentication is performed, the requested decryption operation may be carried out by one or more of the cryptographic applications 133 implementing decryption according to the cryptographic algorithm(s) specified by the algorithm identifier 145. The cryptographic applications 133 used may be configured with the key 147 associated with the ciphertext record 139. The plaintext data generated as output by the cryptographic applications 133 may be provided to the client 106 in response to the service request.

As a non-limiting example, a complete ciphertext record 139 may have been created based upon a credit card number as the plaintext data. In response to the encryption request, the record identifier 141 and key 147 for the particular ciphertext record 139 may have previously been provided to the client 106 requesting encryption. The key 147 may be protected by a wrapper 163 using a password as a wrapper key. At a later time when the client 106 makes a service request to the decryption service 123, the client may provide the record identifier 141, the wrapper 163, including the key 147, and the password used to encrypt the key 147 in the wrapper 163. The cryptographic device may attempt to use the supplied password to extract the key 147 from the wrapper 163, and then compare the extracted key to the key 147 stored in the ciphertext record 139. If the comparison is a match, the decryption of the ciphertext data 143 may proceed and the resulting plaintext data will be provided to the client 106 in a response from the decryption service 123.

The client 106 may make a service request to the validation service 125 in order to validate that the supplied plaintext data is equivalent to the plaintext form of pre-existing ciphertext data 143. The service request made to the validation service 125 may comprise the plaintext data to be validated and a record identifier 141 identifying the particular ciphertext record 139 associated with the ciphertext data 143. In some embodiments, the service request may further comprise one or more authentication credentials associated with the ciphertext record 139, as discussed previously.

Once the plaintext data and record identifier 141 is obtained from the client 106 and any necessary authentication is performed, the requested validation operation may be carried out. In some embodiments, the supplied plaintext data may be encrypted using the same encryption algorithm and key 147 used previously to generate the ciphertext data 143. The result from the encryption operation of the supplied plaintext data may then be compared to the ciphertext data 143. If the comparison is a match, the supplied plaintext data must be identical to the plaintext data from which the ciphertext data 143 was previously produced. In alternate embodiments, the ciphertext data 143 may be decrypted into the plaintext form and compared to the supplied plaintext data within the cryptographic device 103. Regardless of the technique used to effect the validation, the validation service may respond with a Boolean value indicating whether the supplied plaintext data is a match with the plaintext data used to produce the ciphertext data 143.

Figure 2:
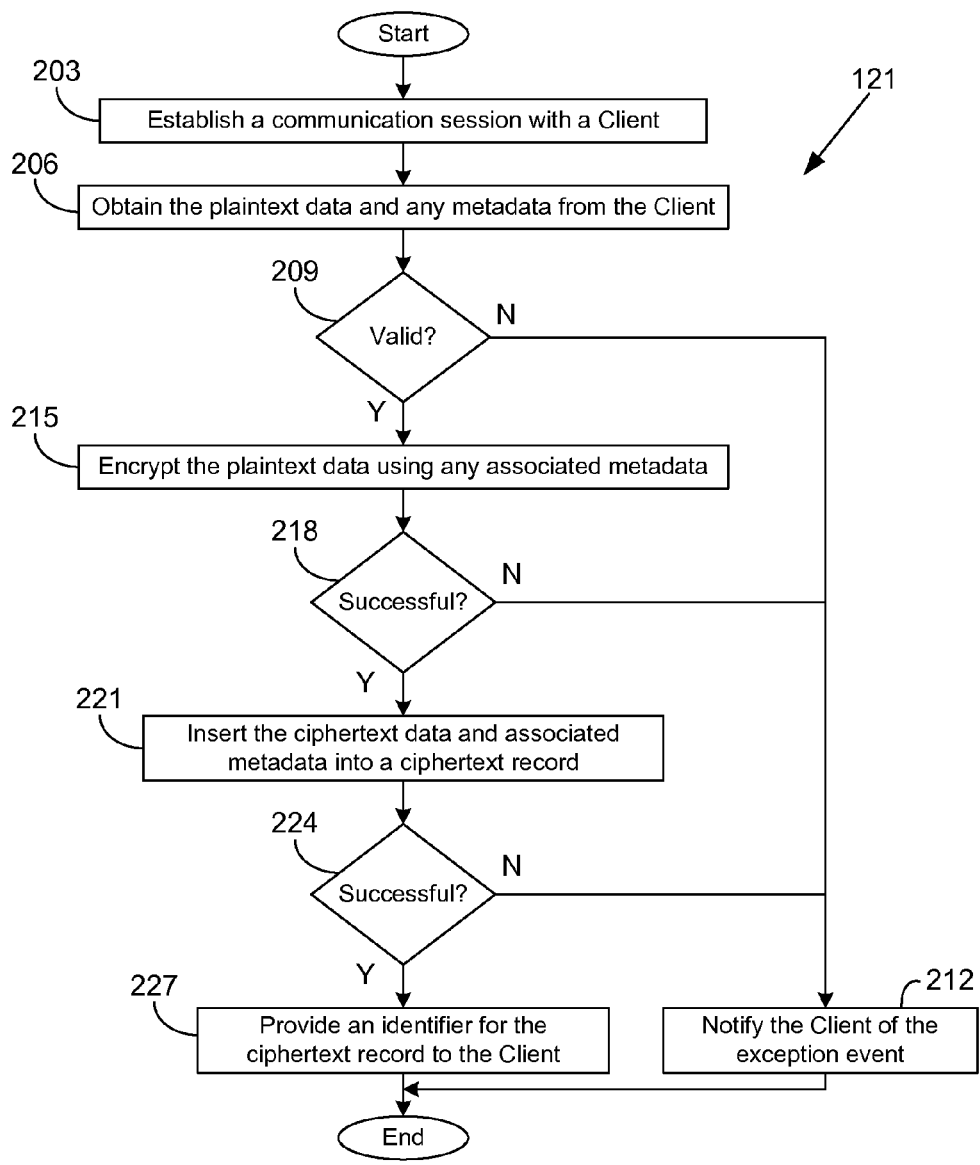
FIG. 2 is a flowchart illustrating one example of functionality implemented as portions of an encryption service executed in a cryptographic device in the networked environment of FIG. 1 according to various embodiments of the present disclosure.

Referring next to FIG. 2, shown is a flowchart that provides one example of the operation of a portion of the encryption service 121 according to various embodiments. It is understood that the flowchart of FIG. 2 provides merely an example of the many different types of functional arrangements that may be employed to implement the operation of the portion of the encryption service 121 as described herein. As an alternative, the flowchart of FIG. 2 may be viewed as depicting an example of steps of a method implemented in the cryptographic device 103 (FIG. 1) according to one or more embodiments.

This portion of the encryption service 121 may be executed in response to obtaining a communication request from a client 106 (FIG. 1). Beginning with block 203, encryption service 121 may establish a secure communication session with the client 106. In some embodiments, the encryption service 121 may supply one or more session credentials 136 (FIG. 1) with which the client device 106 may authenticate the cryptographic device 103. In addition to authentication, the session credentials 136 may be used to facilitate encryption of the communication session, thereby ensuring confidentiality of the data as it is exchanged between the cryptographic device 103 and client 106.

Next, in block 206, the encryption service 121 may obtain a service request from the client 106 that includes the plaintext data to be encrypted. In some embodiments, the client 106 may also provide the cryptographic device 103 with various metadata associated with the plaintext data. Then, in block 209, the encryption service 121 determines whether the requested operation may be carried out. The requested encryption operation may be unable to be completed for various possible reasons such as, for example, a requested encryption algorithm is unavailable, the data store 112 (FIG. 1) does not have sufficient storage available for another ciphertext record 139 (FIG. 1) to store the ciphertext data 143 (FIG. 1), and/or other possible reasons as can be appreciated.

If the encryption operation cannot be carried out, the encryption service 121, in block 212, may notify the client 106 of the exception event, and thereafter this portion of the execution of the encryption service 121 ends as shown. Alternatively, if the operation can be carried out, the encryption service 121, in block 215, initiates encryption of the plaintext data according to any metadata associated with the request. Then, in block 218, the encryption service 121 determines whether the plaintext data was successfully encrypted. If the operation did not complete successfully, execution of the encryption service 121 returns to block 212. Alternatively, if the encryption was successful, in block 221, the ciphertext produced as a result of the encryption may be inserted into the ciphertext data 143 of a ciphertext record 139. Additionally, metadata associated with the encryption operation may be stored in the ciphertext record 139, such as the key 147 (FIG. 1), algorithm identifier 145 (FIG. 1), and/or other possible metadata.

Continuing to block 224, the encryption service 121 determines whether the ciphertext record 139 was successfully populated with the ciphertext data 143 and associated data. If the operation did not complete successfully, execution of the encryption service 121 returns to block 212. Alternatively, if the encryption was successful, in block 227, the encryption service 121 may provide a response to the client 106 that includes the record identifier 141 (FIG. 1) associated with the ciphertext record 139. As discussed previously, the key 147 may also be provided to the client device upon completion of the encryption operation. The key 147 returned may be protected by an encrypted wrapper 163 that permits confidential storage of the key 147 in a reduced-security environment such as the client device 106.

Figure 3:
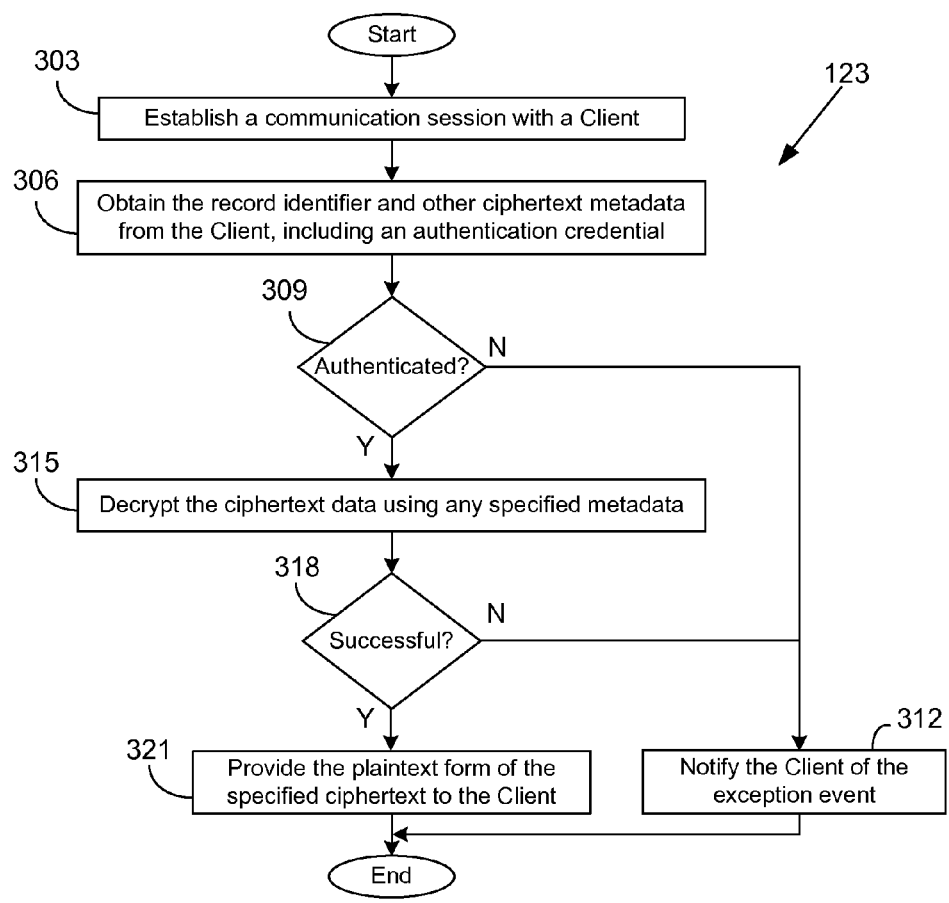
FIG. 3 is a flowchart illustrating one example of functionality implemented as portions of a decryption service executed in a cryptographic device in the networked environment of FIG. 1 according to various embodiments of the present disclosure.

Turning now to FIG. 3, shown is a flowchart that provides one example of the operation of a portion of the decryption service 123 according to various embodiments. It is understood that the flowchart of FIG. 3 provides merely an example of the many different types of functional arrangements that may be employed to implement the operation of the portion of the decryption service 123 as described herein. As an alternative, the flowchart of FIG. 3 may be viewed as depicting an example of steps of a method implemented in the cryptographic device 103 (FIG. 1) according to one or more embodiments.

This portion of the decryption service 123 may be executed in response to obtaining a communication request from a client 106 (FIG. 1). Beginning with block 303, decryption service 123 may establish a secure communication session with the client 106. In some embodiments, the decryption service 123 may supply one or more session credentials 136 (FIG. 1) with which the client device 106 may authenticate the cryptographic device 103. In addition to authentication, the session credentials 136 may be used to facilitate encryption of the communication session, thereby ensuring confidentiality of the data as it is exchanged between the cryptographic device 103 and client 106.

Next, in block 306, the decryption service 123 may obtain a service request from the client 106 that includes a record identifier 141 (FIG. 1) identifying the particular ciphertext record 139 (FIG. 1) associated with the ciphertext data 143 (FIG. 1). In some embodiments, the service request may further comprise one or more authentication credentials associated with the ciphertext record 139. Then, in block 309, the decryption service 123 may determine whether the client 106 has been successfully authenticated.

If the decryption service 123 determines the client 106 has not been successfully authenticated, then in block 312, the decryption service 123 may notify the client 106 of the exception event, and thereafter this portion of the execution of the decryption service 123 ends as shown. Alternatively, if the client 106 has been authenticated, the decryption service 123, in block 315, initiates decryption of the ciphertext data 143 using the cryptographic algorithm(s) specified by the algorithm identifier 145 (FIG. 1) configured with the key 147 (FIG. 1) associated with the ciphertext record 139.

Then, in block 318, the decryption service 123 determines whether the ciphertext data 143 was successfully decrypted. If the operation did not complete successfully, execution of the encryption service 121 returns to block 312. Alternatively, if the decryption was successful, then in block 321, the decryption service 123 may provide a service response to the client 106 that includes the plaintext produced as a result of the decryption of the ciphertext data 143.

Figure 4:
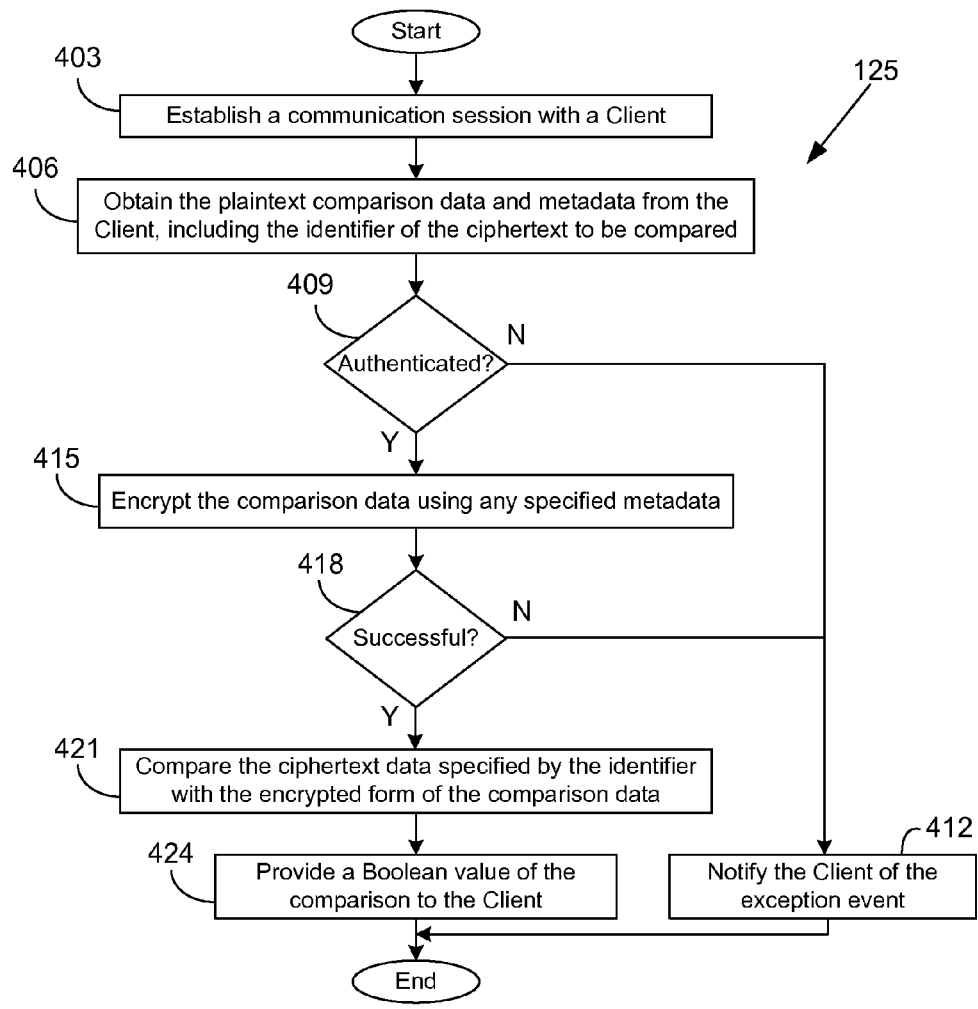
FIG. 4 is a flowchart illustrating one example of functionality implemented as portions of a validation service executed in a cryptographic device in the networked environment of FIG. 1 according to various embodiments of the present disclosure.

Moving on to FIG. 4, shown is a flowchart that provides one example of the operation of a portion of the validation service 125 according to various embodiments. It is understood that the flowchart of FIG. 4 provides merely an example of the many different types of functional arrangements that may be employed to implement the operation of the portion of the validation service 125 as described herein. As an alternative, the flowchart of FIG. 4 may be viewed as depicting an example of steps of a method implemented in the cryptographic device 103 (FIG. 1) according to one or more embodiments.

This portion of the validation service 125 may be executed in response to obtaining a communication request from a client 106 (FIG. 1). Beginning with block 403, validation service 125 may establish a secure communication session with the client 106. In some embodiments, the validation service 125 (FIG. 1) may supply one or more session credentials 136 (FIG. 1) with which the client device 106 may authenticate the cryptographic device 103. In addition to authentication, the session credentials 136 may be used to facilitate encryption of the communication session, thereby ensuring confidentiality of the data as it is exchanged between the cryptographic device 103 and client 106.

Next, in block 406, the validation service 125 may obtain a service request from the client 106 to validate that the supplied plaintext data is equivalent to the plaintext form of pre-existing ciphertext data 143 (FIG. 1). The service request made to the validation service 125 may comprise the plaintext data to be validated and a record identifier 141 (FIG. 1) identifying the particular ciphertext record 139 (FIG. 1) associated with the ciphertext data 143. In some embodiments, the service request may further comprise one or more authentication credentials associated with the ciphertext record 139, as discussed previously.

Then, in block 409, the validation service 125 may determine whether the client 106 has been successfully authenticated. If the validation service 125 determines the client 106 has not been successfully authenticated, the validation service 125, in block 412, may notify the client 106 of the exception event, and thereafter this portion of the execution of the validation service 125 ends as shown. Alternatively, if the client 106 has been authenticated, the validation service 125, in block 415, initiates the requested validation operation as described previously. In some embodiments, the supplied plaintext data may be encrypted using the same encryption algorithm and key 147 (FIG. 1) used previously to generate the ciphertext data 143. In other embodiments, the ciphertext data 143 may instead be decrypted using the encryption algorithm and key 147 specified in the associated ciphertext record 139.

Then, in block 418, the validation service 125 determines whether the encryption or decryption operation used to facilitate the validation was successful. If the operation did not complete successfully, execution of the validation service 125 returns to block 412. Alternatively, if the operation was successful, the validation service 125, in block 421, may compare the compatible forms, either encrypted or decrypted, of the supplied plaintext data and ciphertext data 143. Next, in block 424, the validation service 125 may provide a service response to the client 106 that indicates whether the compatible forms of the supplied plaintext data and ciphertext data 143 are identical.

Figure 5:
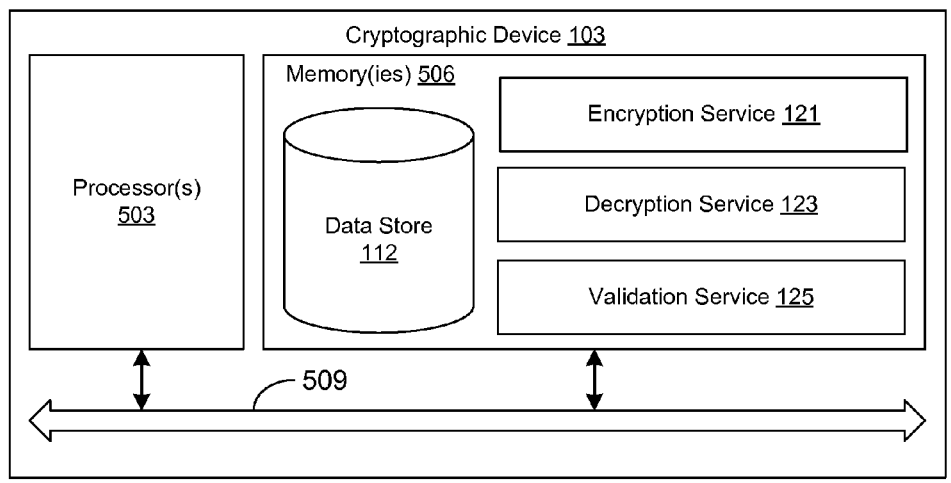
FIG. 5 is a schematic block diagram that provides one example illustration of a cryptographic device employed in the networked environment of FIG. 1 according to various embodiments of the present disclosure.

With reference to FIG. 5, shown is a schematic block diagram of the cryptographic device 103 according to an embodiment of the present disclosure. Each cryptographic device 103 includes at least one processor circuit, for example, having a processor 503 and a memory 506, both of which are coupled to a local interface 509. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the encryption service 121, decryption service 123, validation service 125, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the encryption service 121, decryption service 123, validation service 125, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the encryption service 121, decryption service 123, and validation service 125, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the encryption service 121, decryption service 123, and validation service 125, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a hardware security module (HSM), comprising:
   code that establishes a communication session with a client device via a network, the communication session using an authentication credential, the authentication credential authenticating the HSM and facilitating encryption of a portion of the communication session;
   code that obtains, via the communication session, a service request from the client device, the service request comprising a submitted key and an identifier for a ciphertext record, the ciphertext record comprising ciphertext data and a pre-existing key associated with the ciphertext data;
   code that generates a comparison of the submitted key and the pre-existing key, the comparison authenticating the client device;
   code that generates plaintext data based upon the ciphertext data, wherein the comparison indicates the submitted key and the pre-existing key are identical, and the plaintext data is generated using an implementation of a cryptographic algorithm configured with the submitted key, the cryptographic algorithm being specified in the ciphertext record and selected from the group consisting of Advanced Encryption Standard (AES), Triple Data Encryption Algorithm (3-DES), and Skipjack; and code that provides, via the communication session, a service response to the client device, the service response comprising the plaintext data.

2. The non-transitory computer-readable medium of claim 1, wherein the implementation of the cryptographic algorithm complies with Federal Information Processing Standards Publication (FIPS PUB) 140-2.

3. The non-transitory computer-readable medium of claim 1, wherein the client device is limited to a pre-defined threshold rate of service requests in response to a mismatch in the comparison of the submitted key and the pre-existing key.

4. A system, comprising:
a cryptographic computing device having a processor, a memory, and a tamper protective enclosure; and
an encryption service executable in the cryptographic computing device, the encryption service comprising:
logic that obtains a service request from a client, the service request comprising plaintext data to be encrypted and associated metadata;
logic that generates ciphertext data based upon the plaintext data, wherein the encryption service implements an encryption algorithm;
logic that stores a record in a data store of the cryptographic computing device, the record comprising the ciphertext data; and
logic that provides a service response to the client, the service response comprising a record identifier, the record identifier being an index to the record in the data store.

5. The system of claim 4, wherein the metadata further comprises an algorithm identifier, the algorithm identifier specifying the encryption algorithm.

6. The system of claim 4, wherein the metadata further comprises a key and the encryption algorithm is configured with the key.

7. The system of claim 4, wherein the service request from the client is obtained via a communication session, a portion of the communication session being encrypted.

8. The system of claim 7, wherein the communication session occurs over a network.

9. The system of claim 4, wherein the cryptographic computing device is one of a plurality of cryptographic computing devices available to the client, and the one of the cryptographic computing devices is selected from the cryptographic computing devices by a proxy device.

10. The system of claim 4, wherein the service response comprises a key used by the encryption algorithm to generate the ciphertext data, the key being secured by an encrypted wrapper.

11. The system of claim 10, wherein the encrypted wrapper complies with the Public Key Cryptography Standards (PKCS).

12. A method, comprising the steps of:
obtaining, in a cryptographic computing device, a service request from a client, the service request comprising plaintext data to be verified and associated metadata, the metadata comprising an identifier for a record comprising pre-existing ciphertext data, the cryptographic computing device being tamper-protected;
generating, in the cryptographic computing device, candidate ciphertext data based upon the plaintext data, the candidate ciphertext data being generated by a cryptographic service implementing an encryption algorithm;
producing, in the cryptographic computing device, a comparison of the candidate ciphertext data and the pre-existing ciphertext data; and
providing, in the cryptographic computing device, a service response to the client, the service response comprising a result of the comparison.

13. The method of claim 12, wherein the record comprises an algorithm identifier and a key, the algorithm identifier specifying the encryption algorithm, and the encryption algorithm being configured with the key.

14. The method of claim 12, wherein the service request from the client is obtained via a communication session, a portion of the communication session being encrypted.

15. The method of claim 14, wherein the communication session occurs via a bus of a master computing device to which the cryptographic computing device is attached.

16. The method of claim 12, wherein the metadata further comprises an algorithm identifier, the algorithm identifier specifying the encryption algorithm.

17. The method of claim 16, wherein the metadata further comprises a key and the encryption algorithm is configured with the key.

18. The method of claim 12, wherein the record is one of a plurality of records, and a subset of the records are stored in a data store accessible to the cryptographic computing device via a network.

19. The method of claim 12, wherein the cryptographic computing device is one of a plurality of cryptographic computing devices available to the client, and the one of the cryptographic computing devices is selected from the cryptographic computing devices by the client.

20. The method of claim 12, wherein the client is limited to a pre-defined threshold rate of service requests.

* * * * *